United States Patent [19]

Hargrove

[11] Patent Number: 5,602,981

[45] Date of Patent: Feb. 11, 1997

[54] QUICKSELECT ICON BUTTON ON A COMPUTER DISPLAY WHICH REDISPLAYS THE LAST VIEW STYLE ACTIVATED BY THE ICON BUTTON

[75] Inventor: Richard R. Hargrove, Fall City, Wash.

[73] Assignee: Microsoft Corporation, Redmond, Wash.

[21] Appl. No.: 964,153

[22] Filed: Oct. 21, 1992

[51] Int. Cl.$^6$ .................................................. G06F 15/00
[52] U.S. Cl. ............................................. 395/352; 395/348
[58] Field of Search ............................ 395/159, 155–161; 364/200; 345/117–120

[56] References Cited

U.S. PATENT DOCUMENTS

| | | | |
|---|---|---|---|
| 4,901,221 | 2/1990 | Kodosky et al. | 364/200 |
| 5,191,645 | 3/1993 | Carlucci et al. | 395/159 |
| 5,303,388 | 4/1994 | Kreitman et al. | 395/159 |

FOREIGN PATENT DOCUMENTS 1267725  10/1989  Japan .

OTHER PUBLICATIONS

Cowart, Robert, "Mastering Windows 3.1", Sybex Inc., 1993, pp. 66 & 68.

Screen Dumps From Windows®, Microsoft Corporation, 1985–1992, pp. 1–3.

Perry, Tekla S. "Of Mice and Menus: designing the user-friendly interface", *IEEE Spectrum*, Sep. 1989, pp. 46–51.

Hsia, Yen–Teh; Ambler, Allen L., "Construction and Manipulation of Dynamic Icons", IEEE Computer Society Press, 1988, pp. 78–83.

Jensen, Gary; Anderson, Loy, *Harvard Graphics: The Complete Reference*, Osborne McGraw–Hill, 1990, pp. 5, 126–129, 420–440, 503–509, 551, 555–622.

*Primary Examiner*—Kee M. Tung
*Assistant Examiner*—U. Chauhan
*Attorney, Agent, or Firm*—Seed and Berry LLP

[57] ABSTRACT

A computer system having a visual display which displays a selectable button and permits a user to quickly redisplay a previous visual display selected by the user is disclosed. The selectable button preferably contains a textual or graphical representation upon the face of the button which indicates the previous visual display. When a new visual display is selected by the user, either by single clicking on the button or by a click-and-drag operation, the button is revised such that the previous visual display is selectable by the single clicking on the selectable button. The visual display of this invention allows the user to quickly and conveniently revert to a previous visual display by a single user operation utilizing a selectable button.

36 Claims, 6 Drawing Sheets

QUICKSELECT ICON BUTTON ON A COMPUTER DISPLAY WHICH REDISPLAYS THE LAST VIEW STYLE ACTIVATED BY THE ICON BUTTON

TECHNICAL FIELD

This invention is generally directed to a user interface for a computer system, and more specifically, to a user selectable button which permits the user to quickly redisplay the last view style activated by the user selectable button.

BACKGROUND OF THE INVENTION

A computer system displays information to the user by a visual display. The ability of the user to access the information quickly and conveniently is, in large part, dependent upon the ease by which the user may interact with the computer through its visual display. Numerous advances in user interface design have been made which simplify the user's interaction .with the computer system. For example, the click and point characteristics of a mouse offer the user a visual alternative to conventional keyboard input. Similarly, "push buttons" displayed on the visual display, and selectable by the mouse pointer, permit the user to quickly activate selectable commands or options.

Despite the advances that have been made in user interface design, there still exists a need in the art for visual displays which permit a user to quickly and conveniently manipulate the computer system, particularly in the area of push buttons and the corresponding selectable commands or options which they activate.

SUMMARY OF THE INVENTION

Accordingly, it is an object of the present invention to provide a user interface for a computer system which permits the user to access and display information controlled by a user interface display button. The present invention fulfills this objective, and provides further related advantages.

In one embodiment, the present invention is directed to a method in a computer system having a display device. The method includes displaying on the display device a view style button which is capable of altering the visual display of the display device by selection thereof. The view style button has a first and a second state, where the first state corresponds to a present or current visual display and the second state corresponds to a previous visual display. Preferably, the view style button in the first state includes, on at least a portion of the button, a textual or graphical representation of the nature of the visual display when the view style button is in the second state.

In a further embodiment, there is disclosed a method in a computer controlled display system having a visual display, wherein the method includes generating and displaying a first visual display and a first view style button which is capable of altering the visual display upon selection by the user, selecting the first view style button, generating and displaying a second visual display corresponding to the first view style button, and regenerating and redisplaying the first view style button as a second view style button where the second view style button corresponds to the first Visual display. In a preferred embodiment, the second view style button has displayed on at least a portion of the button a textual or graphical representation of the first visual display.

In yet a further embodiment, this invention is directed to a computer system including a computer, a display device operatively linked to the computer, means for displaying on the display device a view style button which is capable of altering the visual display of the display device by selection thereof, wherein the view style button has a first state corresponding to a present visual display and a second state corresponding to a previous visual display, and a means for selecting the view style button to change the state of the visual display form the first state to the second state.

DETAILED DESCRIPTION OF THE INVENTION

Figure 1:
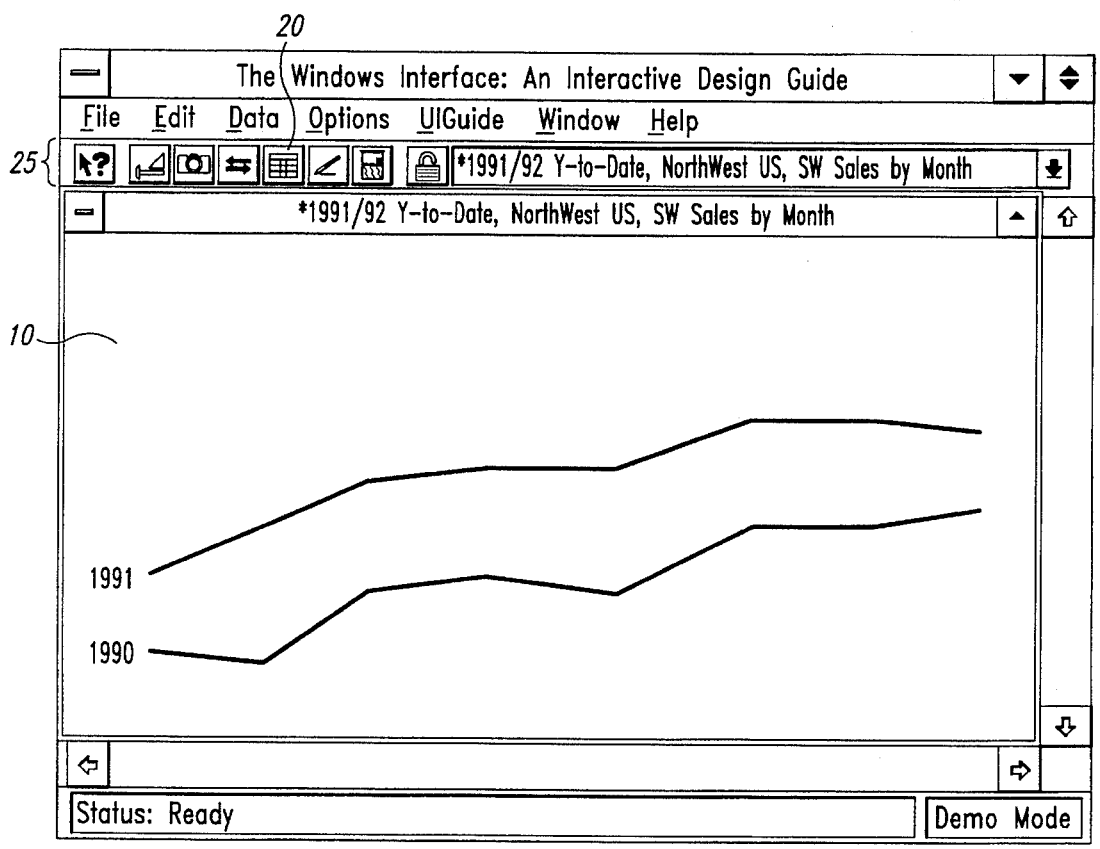
FIG. 1 illustrates a visual display generated by a computer system for one embodiment of the present invention, with the visual display representing certain data in chart form and depicting a user selectable view style button.

The present invention discloses a visual display for a computer system which employs user selectable buttons and permits the user to quickly redisplay the last view style activated by the button. The display of information on the visual display (hereinafter referred to as the "view") can be changed by the user with the appropriate user selectable button (hereinafter referred to as the "view style button"). While the user may select the view style button by keyboard input, in the practice of the present invention the use of a mouse pointer device is preferred. The control and display of a mouse-controlled pointer device, as well as one or more user selectable push buttons, are known visual displays, and one skilled in the art can readily generate such visual displays.

In the practice of the present invention, the user may change the view by clicking-and-dragging the mouse pointer device over the view style button generated and displayed by a particular application program. Preferably, the view style button is located on the applications "tool bar". When the View style button is selected by clicking-and-dragging, one or more additional buttons appear on the visual display which permit the user to select an alternative view (hereinafter referred to as "alternative view style buttons"). By moving the mouse cursor over an alternative view style button, and releasing the mouse (i.e., releasing the mouse button), the new view will appear on the visual display. For example, if the first view was a line chart of certain data, and the newly selected alternative view style button was for a bar chart, releasing the mouse over the bar chart button will cause the visual display to display the data in bar chart form. In other words, the newly selected alternative view style button will cause the computer system to redraw the data in the selected view.

The view style button of this invention will automatically remember the last two view styles displayed. The user may switch or toggle back and forth between the last two view styles by clicking (i.e., single clicking the mouse button) on the view style button. For example if the currently displayed view is a line chart, and the previous view was a bar chart, single clicking on the view style button will cause the computer system to redisplay the data as a bar chart. Clicking on the view style button a second time will cause the computer system to redisplay the data as a line chart.

In a preferred embodiment, a textual and/or graphical image is displayed on the view style button which corresponds to the view which will be displayed by clicking on the view style button. For example, if the current view is a line chart, and the previous view was a table of data, the face of the view style button will indicate that selection of the view style button will redisplay the data as a table. When clicked, the view style button will cause the computer system to redraw the line chart as a table of data, and will update the image of the view style button by displaying an image thereon to indicate a line chart (since the previous view is now the line chart view). If the view style button is clicked again, the view will be redrawn in the style of a line chart, and the view style button will be updated to display a table icon.

Figure 2:
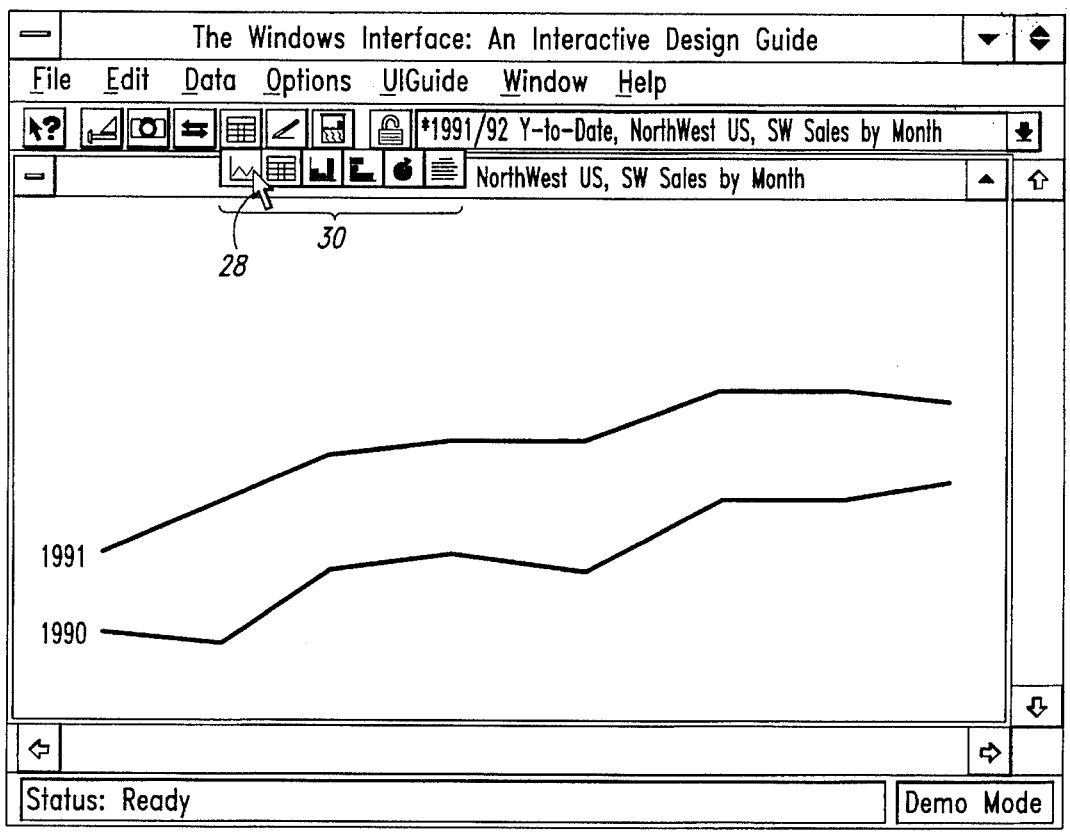
FIG. 2 illustrates the alternative view style buttons which are displayed when the user clicks-and-drags on the view style button.
Figure 3:
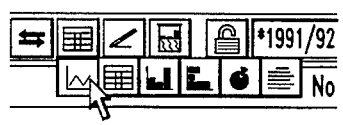
FIG. 3 illustrates a more detailed view of the alternative view style buttons of FIG. 2.
Figure 4:
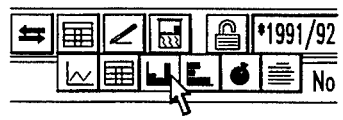
FIG. 4 illustrates the visual display of a computer system when the user drags the mouse pointer over the alternative view style button corresponding to a bar chart display format.

Referring to FIG. 1, the visual display (10) generated by application program "Windows Interface: An Interactive Design Guide" is illustrated. In this figure, data (identified as "1991/92 Y-to-Date, NorthWest U.S., Sales by Month") is displayed in a line chart format. The View style button (20) is displayed in the tool bar (25) of the application visual display. A table icon appears on the face of the view style button to represent the previous view (in this case, a table of data). As illustrated in FIG. 2, when the user selects the view style button by clicking-and-dragging on that button with mouse cursor (28), one or more alternative view style buttons are displayed as a pop-up button bar (30). A more detailed illustration of the pop-up button bar of FIG. 2 is illustrated in FIG. 3. The user may select one of the alternative view style buttons by dragging the mouse cursor over the desired button as illustrated in FIG. 4, and releasing the mouse button. In FIG. 4, the mouse cursor has been moved dragged the alternative view style button corresponding to a bar chart format. When the mouse cursor is released over this button, the visual display illustrated in FIG. 5 is displayed by the computer system.

Figure 5:
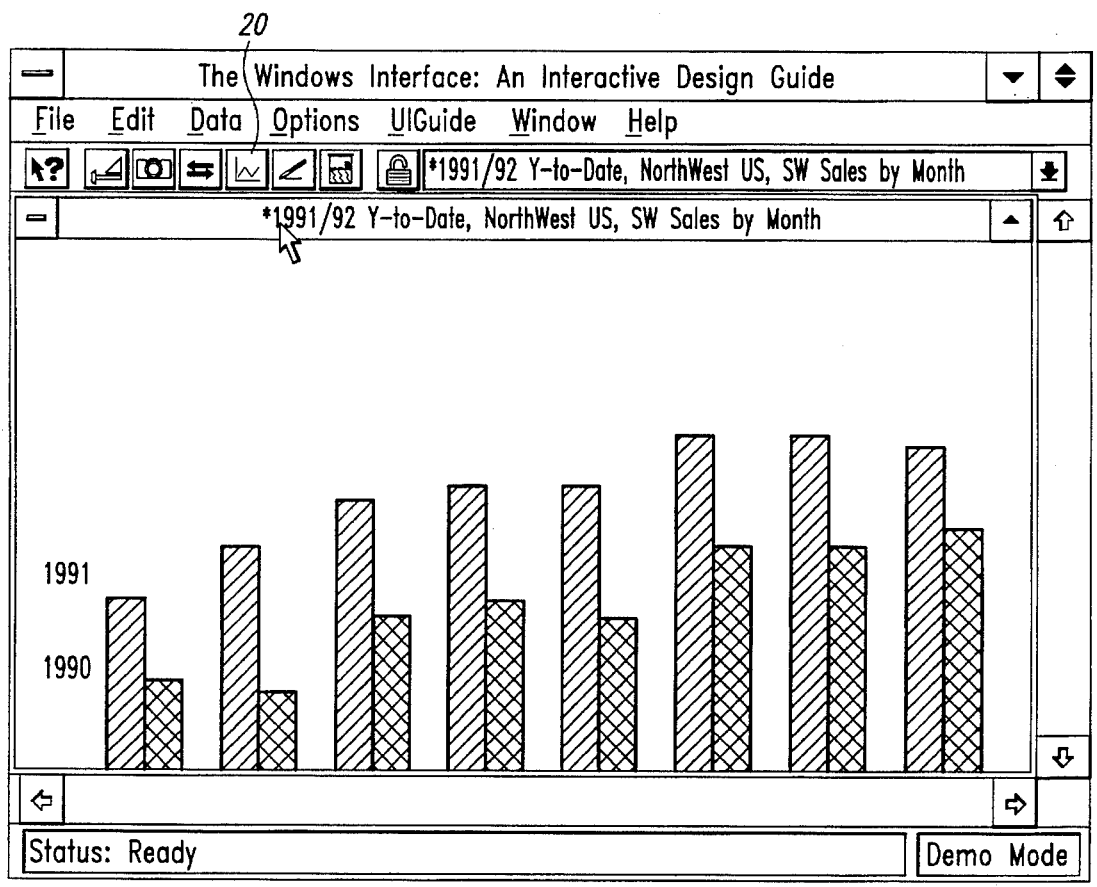
FIG. 5 illustrates the visual display generated by the computer system upon selection of the bar chart alternative view style button.
Figure 6:
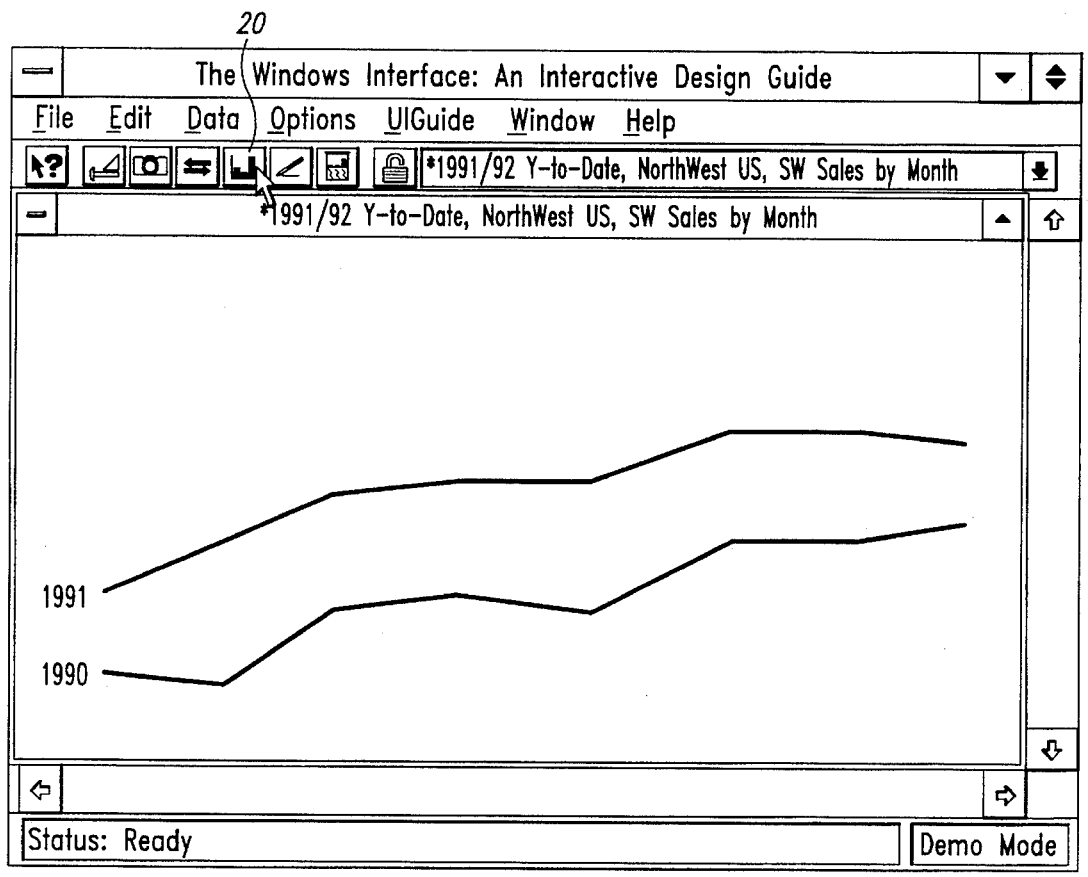
FIG. 6 illustrates the visual display generated by the computer system when the user single clicks on the view style button of FIG. 5.
Figure 7:
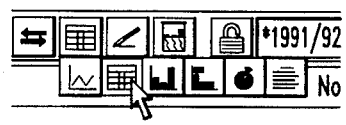
FIG. 7 illustrates the alternative view style buttons which are displayed on the visual display of the computer system when the user clicks-and-drags the mouse courser on the view style button of FIG. 6.
Figure 8:
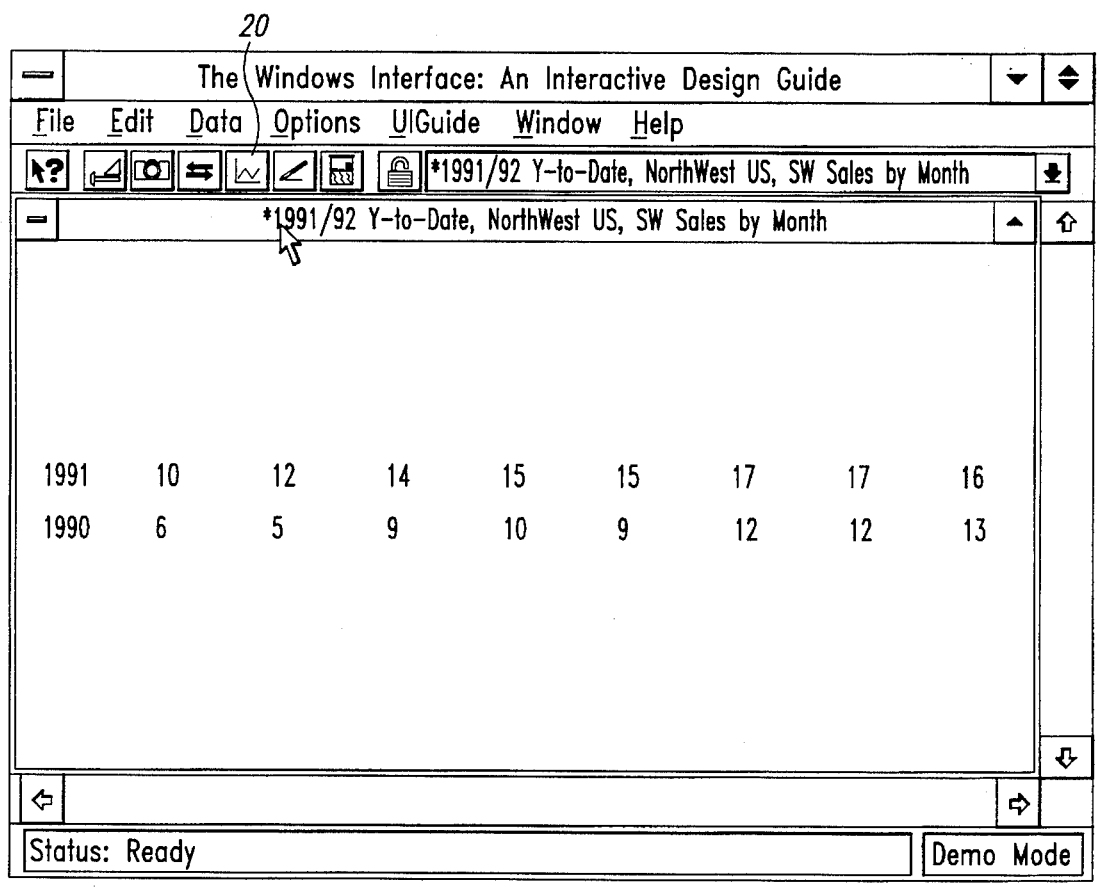
FIG. 8 illustrates the visual display generated by the computer system when the user drags the mouse courser over the alternative view style button of FIG. 7 represented by the graph icon, and then releases the mouse cursor over that button.

In a preferred embodiment, the view style button (20) of FIG. 5 now depicts a line chart icon on the face of the button to represent the previous view. By single clicking on the view style button, the user may redisplay the previous view as illustrated in FIG. 6. The view style button (20) now depicts a bar graph icon to represent the previous view. The user may again select the view style button by clicking-and-dragging on the button to display the alternative view style buttons as illustrated in FIG. 7. By dragging the mouse pointer to the alternative view style button designated by the chart icon, and releasing the mouse at that location, the computer display presents the view illustrated in FIG. 8. The view style button (20) now depicts a bar chart icon to represent the previous view (i.e., FIG. 6). By single clicking on the view style button, the computer system redisplays the visual display of FIG. 1.

Figure 9:
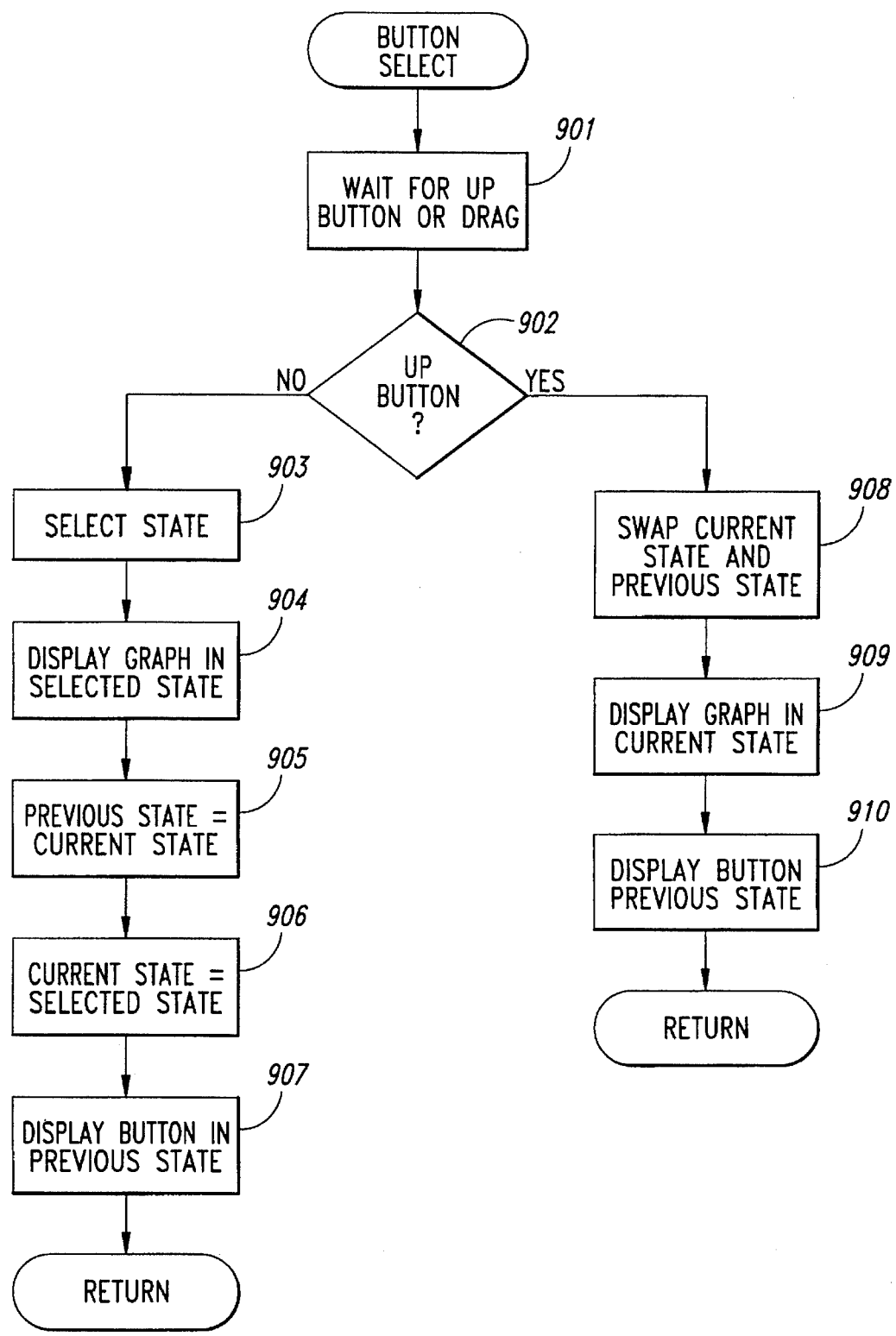
FIG. 9 is a flow diagram of a routine which is involved when a user selects the view style button by single clicking on the button, or by a click-and-drag selection.

FIG. 9 is a flow diagram of routine which is involved when a user selects the view style button of the present invention. The routine inputs the previous view and the current view and either toggles between the two views or allows the user to select a new view. In step 901, the routine waits for the user to either single click on the view style button with the mouse cursor, or click-and-drag on the view style button to display the alternative view style buttons. In step 902, if the user single clicked on the view style button then the routine continues at 908, else the routine continues at 903. In step 903, the routine inputs a display state corresponding to the alternative view style button selected by the user (i.e., when the user releases the mouse cursor over the desired alternative view style button). In step 904, the routine displays the newly selected display state. In step 905, the previous view state is changed to the current view state. In step 906 the current view is changed to the selected view. In step 907 the view style button is displayed corresponding to the previous view state, and the routine returns. When the user single clicks on the view style button, the routine, instep 908, swaps the current view and the previous view. In step 909, the routine displays the current view. In step 910, the view style button is displayed as the previous state, and then returns.

While this invention has been shown and described with reference to certain preferred embodiments, it will be understood by those skilled in the art that various changes or modifications in form and detail may be made without departing from the spirit and scope of this invention.

I claim:

1. A method in a computer system for altering a visual display on a display device, the computer system having at least three visual displays that can be selected between, a previous visual display initially corresponding to a first of the visual displays, a current visual display initially corresponding to a second of the visual displays, the method comprising the steps of:

displaying on the display device a single, graphical, view style button having a current state and a previous state;

setting the previous state to correspond to the previous visual display and setting the current state to correspond to the current visual display;

using the view style button, alternating between displaying the previous visual display and the current visual display;

displaying the view style button with a graphical representation of the previous visual display when displaying the current visual display on the display device;

displaying the view style button with a graphical representation of the current visual display when displaying the previous visual display on the display device;

using the view style button, selecting a third visual display, such that the current visual display becomes the previous visual display and the third visual display becomes the current visual display, and such that the previous state of the view style button now corresponds to the second visual display and the current state now corresponds to the third visual display; and after selecting the third visual display, using the same view style button to alternate between displaying the second visual display and the third visual display.

2. A method in a computer system for altering a visual display on a display device, the computer system having at least three visual displays that can be selected between, a first of the visual displays designated as a previous visual display, a second of the visual displays designated as a current visual display, and having a view style button with a current state and a previous state, the current state corresponding to the current visual display, the previous state corresponding to the previous visual display, the method comprising the steps of:

displaying the view style button on the display device, such that the view style button is displayed according to the previous state when displaying the current visual display on the display device and such that the view style button is displayed according to the current state when displaying the previous visual display on the display device;

using the view style button, alternating between displaying the previous visual display and the current visual display;

using the view style button, designating a third visual display as the current visual display, such that the second visual display now becomes designated as the previous visual display, the previous state now corresponds to the second visual display, and the current state now corresponds to the third visual display; and after designating the third visual display as the current visual display, using the view style button to alternate between displaying the second visual display and the third visual display.

3. The method of claim 2 wherein the step of displaying the view style button on the display device such that the view style button is displayed according to the previous state depicts on a portion of the view style button a textual representation of the previous visual display.

4. The method of claim 2 wherein the step of displaying the view style button on the display device such that the view style button is displayed according to the previous state depicts on a portion of the view style button a graphical representation of the previous visual display.

5. The method of claim 2 wherein the step of displaying the view style button on the display device such that the view style button is displayed according to the current state depicts on a portion of the view style button a textual representation of the current visual display.

6. The method of claim 2 wherein the step of displaying the view style button on the display device such that the view style button is displayed according to the current state depicts on a portion of the view style button a graphical representation of the current visual display.

7. The method of claim 2 wherein the step of alternating between displaying the previous visual display and the current visual display is accomplished by a first operation of a pointing device on the view style button.

8. The method of claim 7 wherein the step of designating a third visual display as the current visual display is accomplished by a second operation of a pointing device on the view style button.

9. The method of claim 2 wherein the step of designating a third visual display as the current visual display is accomplished by a second operation of a pointing device on the view style button.

10. A computer system comprising:

a display device connected to the computer system;

means for displaying on at least a portion of the display device a graphical view style button capable of altering a visual display displayed on at least a portion of the display device by selection thereof, wherein the view style button has a previous state and a present state, the previous state corresponding to a previous visual display, the present state corresponding to a present visual display, and wherein the previous visual display and the present visual display are selected from a group of at least three different visual displays;

means for selecting the view style button to toggle between the previous state and the present state, such that the previous visual display and the present visual display are displayed alternately on the display device; and means for selecting the view style button to designate a third visual display that is not the same as the previous visual display and the present visual display as a new present visual display, wherein the present visual display becomes a new previous visual display, such that the means for selected the view style button to toggle between the previous state and the present state will alternately display the new previous visual display and the new present visual display.

11. The system of claim 10 wherein the view style button is displayed on the display device according to the previous state when the present visual display is displayed.

12. The system of claim 11 wherein the view style button depicts on a portion thereof a textual representation of the previous visual display when the view style button is displayed according to the previous state.

13. The system of claim 11 wherein the view style button depicts on a portion thereof a graphical representation of the previous visual display when the view style button is displayed according to the previous state.

14. The system of claim 10 wherein the view style button is displayed on the display device according to the present state when the previous visual display is displayed.

15. The system of claim 14 wherein the view style button depicts on a portion thereof a textual representation of the present visual display when the view style button is displayed according to the present state.

16. The system of claim 14 wherein the view style button depicts on a portion thereof a graphical representation of the present visual display when the view style button is displayed according to the present state.

17. The system of claim 10 wherein the means for selecting the view style button to toggle between the previous state and the current state utilizes a first operation of a pointing device.

18. The system of claim 10 wherein the means for selecting the view style button to designate the third visual display as the new present visual utilizes a second operation of a pointing device.

19. A computer-readable memory device containing instructions for controlling a computer processor in a computer system to alter a visual display on a display device, the computer system having at least three visual displays that can be selected between, a first of the visual displays designated as a previous visual display, a second of the visual displays designated as a current visual display, and having a view style button with a current state and a previous state, the current state corresponding to the current visual display, the previous state corresponding to the previous visual display, by performing the steps of:

displaying the view style button on the display device, such that the view style button is displayed according to the previous state when displaying the current visual display on the display device and such that the view style button is displayed according to the current state when displaying the previous visual display on the display device;

using the view style button, alternating between displaying the previous visual display and the current visual display;

using the view style button, designating a third visual display as the current visual display, such that the second visual display now becomes designated as the previous visual display, the previous state now corresponds to the second visual display, and the current state now corresponds to the third visual display; and after designating the third visual display as the current visual display, using the view style button to alternate between displaying the second visual display and the third visual display.

20. The memory device of claim 19 wherein the step of displaying the view style button on the display device such that the view style button is displayed according to the previous state depicts on a portion of the view style button a textual representation of the previous visual display.

21. The memory device of claim 19 wherein the step of displaying the view style button on the display device such that the view style button is displayed according to the previous state depicts on a portion of the view style button a graphical representation of the previous visual display.

22. The memory device of claim 19 wherein the step of displaying the view style button on the display device such that the view style button is displayed according to the current state depicts on a portion of the view style button a textual representation of the current visual display.

23. The memory device of claim 19 wherein the step of displaying the view style button on the display device such that the view style button is displayed according to the current state depicts on a portion of the view style button a graphical representation of the current visual display.

24. The memory device of claim 19 wherein the step of alternating between displaying the previous visual display and the current visual display is accomplished by a first operation of a pointing device on the view style button.

25. The memory device of claim 24 wherein the step of designating a third visual display as the current visual display is accomplished by a second operation of a pointing device on the view style button.

26. The memory device of claim 19 wherein the step of designating a third visual display as the current visual display is accomplished by a second operation of a pointing device on the view style button.

27. A method in a computer system for selecting one of a plurality of visual displays to display on a display device, the method comprising the steps of:

displaying a current visual display on the display device, the current visual display displayed instead of a previous visual display that was displayed on the display device;

displaying a graphical button on the display device;

receiving a button event corresponding to the displayed graphical button;

when the received button event is a first type of event, displaying the previous visual display instead of the current visual display; and when the received button event is a second type of event, displaying an indication of each of the plurality of visual displays;

receiving a selection of one of the indications of a visual display other than the current visual display and the previous visual display; and displaying the visual display indicated by the received selection.

28. The method of claim 27, further comprising the step of, when the previous visual display is displayed instead of the current visual display, displaying the graphical button with a textual representation of the current visual display.

29. The method of claim 27, further comprising the step of, when the previous visual display is displayed instead of the current visual display, displaying the graphical button with a graphical representation of the current visual display.

30. The method of claim 27, further comprising the step of, when the current visual display is displayed instead of the previous visual display, displaying the graphical button with a textual representation of the previous visual display.

31. The method of claim 27, further comprising the step of, when the current visual display is displayed instead of the previous visual display, displaying the graphical button with a graphical representation of the previous visual display.

32. The method of claim 27 wherein the first type of event is a single click of a pointing device.

33. The method of claim 32 wherein the second type of event is an indication of a click-and-drag operation of a pointing device.

34. The method of claim 27 wherein the second type of event is an indication of a click-and-drag operation of a pointing device.

35. The method of claim 27 wherein the first type of event is a single mouse click and the second type of event is a double mouse click.

36. The method of claim 27 wherein the first type of event is a double mouse click and the second type of event is a single mouse click.

* * * * *